United States Patent
Touraud et al.

(10) Patent No.: US 8,334,359 B2
(45) Date of Patent: Dec. 18, 2012

(54) MODIFIED POLYAMIDE, METHOD FOR PREPARING SAME, AND ARTICLE OBTAINED FROM SAID POLYAMIDE

(75) Inventors: Franck Touraud, Eyzin Pinet (FR); Stéphane Jeol, Lyons (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/120,958

(22) PCT Filed: Sep. 25, 2009

(86) PCT No.: PCT/EP2009/062438
§ 371 (c)(1), (2), (4) Date: Jun. 13, 2011

(87) PCT Pub. No.: WO2010/034805
PCT Pub. Date: Apr. 1, 2010

(65) Prior Publication Data
US 2011/0245450 A1    Oct. 6, 2011

(30) Foreign Application Priority Data

Sep. 26, 2008 (FR) .................................. 08 05300

(51) Int. Cl.
*C08G 64/00* (2006.01)
*C08G 63/02* (2006.01)

(52) U.S. Cl. ........ 528/196; 264/539; 524/606; 528/183; 528/184

(58) Field of Classification Search .................. 264/539; 524/606; 528/183, 184
See application file for complete search history.

(56) References Cited

U.S. PATENT DOCUMENTS

| | | |
|---|---|---|
| 3,161,608 A | 12/1964 | Caldwell et al. |
| 3,862,087 A | 1/1975 | Heller et al. |
| 2003/0166796 A1 | 9/2003 | Imaizumi et al. |
| 2011/0245450 A1* | 10/2011 | Touraud et al. ............... 528/184 |

FOREIGN PATENT DOCUMENTS

JP    2004035638 A    2/2004

OTHER PUBLICATIONS

International Search Report dated Mar. 10, 2010 issued in International Application No. PCT/EP2009/062438.

* cited by examiner

*Primary Examiner* — Terressa Boykin
(74) *Attorney, Agent, or Firm* — SNR Denton US LLP

(57) ABSTRACT

A polyamide modified by a compound including at least one hydroxyl group, as well as to a method for preparing such a polyamide, and articles obtained from such a polyamide are described. A polyamide modified by a compound comprising at least one aromatic hydroxyl group and chemically bonded to the polymer chain, obtained by the polymerization of polyamide monomers with at least one difunctional hydroxyaromatic compound in which both functions can react with an amino function is also described.

14 Claims, No Drawings

MODIFIED POLYAMIDE, METHOD FOR PREPARING SAME, AND ARTICLE OBTAINED FROM SAID POLYAMIDE

This application is the United States national phase of PCT/EP2009/062438, filed Sep. 25, 2009, and designating the United States (published in the French language on Apr. 1, 2010, as WO 2010/034805 A1; the title and abstract were also published in French), which claims foreign priority under 35 U.S.C. §119 of FR 0805300, filed Sep. 26, 2008, each hereby expressly incorporated by reference in its entirety and each assigned to the assignee hereof.

The present invention relates to a polyamide modified by a compound comprising at least one hydroxyl group, to a process for the preparation of this polyamide and to articles obtained from this modified polyamide. The invention relates more particularly to a polyamide modified by a compound which comprises at least one aromatic hydroxyl group and which is chemically bonded to the polymer chain, which modified polyamide is obtained by polymerization of polyamide monomers with at least one difunctional hydroxyaromatic compound, the two functional groups of which can react with an amine functional group.

Thermoplastic polymers are starting materials capable of being converted, by molding, injection molding, injection/blow molding, extrusion, extrusion/blow molding or spinning, in particular into multiple articles, such as parts, for example for bodywork, which are blow-molded, extruded or molded, yarns, fibers or films.

There exists at least two major constraints in all these areas of conversion of thermoplastic polymer.

The first of these constraints is that the thermoplastic polymers employed must be characterized, in the molten state, by a viscosity or a rheological behavior compatible with the forming processes targeted above. These thermoplastic polymers have to be sufficiently fluid, when they are molten, to be able to be conveyed and handled easily and rapidly in some types of forming machinery.

The other constraint which weighs on thermoplastic polymer compositions is related to the mechanical qualities which they have to exhibit after having been melted, formed and hardened by cooling. These mechanical qualities are in particular the thermomechanical properties.

Among thermoplastic polymers, polyamides are polymers of great industrial and commercial interest, in particular aliphatic polyamides. These aliphatic polyamides can be easily synthesized and converted by the molten route. However, an ongoing search is underway to improve their mechanical properties, in particular their thermomechanical properties.

A main subject matter of the invention is a polyamide modified by a compound comprising at least one aromatic hydroxyl group chemically bonded to the chain of the polymer, the polyamide being obtained by polymerization starting from at least the following monomers:
i) A1) a difunctional hydroxyaromatic compound, the two functional groups of which can react with an amine functional group, and
ii) at least polyamide monomers chosen from:
B) a dicarboxylic acid compound B1), which is an aliphatic or cycloaliphatic or arylaliphatic diacid, and C) an aliphatic, cycloaliphatic or arylaliphatic diamine, and
D) a lactam or an amino acid, preferably one which is aliphatic;
where the monomer B is solely of the B1) type, the molar proportion of monomer A1) with respect to the monomers A1) and B) is between 0.1 and 30%, advantageously between 0.5 and 25%, preferably between 5 and 20%.

Preferably, the polyamide is obtained by polymerization of at least the following monomers:
A1) a difunctional hydroxyaromatic compound, the two functional groups of which can react with an amine functional group,
optionally at least one dicarboxylic acid compound B1), which is an aliphatic or cycloaliphatic or arylaliphatic diacid,
at least one aliphatic, cycloaliphatic or arylaliphatic diamine C), and
optionally a lactam or an amino acid D), preferably one which is aliphatic.

The modified polyamide of the invention can be easily synthesized and converted by the molten route and it exhibits better mechanical properties, in particular better thermomechanical properties, than an unmodified polyamide.

The term "aromatic hydroxyl group" is understood to mean a hydroxyl functional group attached to a carbon atom forming part of an aromatic ring.

The term "hydroxyaromatic compound" is understood to mean a compound comprising at least one aromatic hydroxyl group.

The term "chemically bonded" is understood to mean bonded via a covalent bond.

The hydroxyaromatic compound of the invention is an organic compound comprising at least one aromatic hydroxyl group.

The functional groups which can react with an amine functional group are in particular acid functional groups, the ketone functional group and the aldehyde functional group.

Compound having an "acid functional group" is understood to mean an organic compound comprising a carboxylic acid functional group or a functional group derived from a carboxylic acid, such as an acid chloride, acid anhydride, amide or ester functional group.

The aromatic hydroxyl groups of the invention are not regarded as functional groups which react with acid functional groups.

Advantageously, the hydroxyl group of the monomer A1) is not hindered, that is to say, for example, that the carbon atoms situated in the a position with respect to the hydroxyl functional group are preferably not substituted by bulky substituents, such as branched alkyls.

The compound A1) is preferably a compound of following formula (I):

$$(HO)_x-Z-(COOH)_2 \qquad (I)$$

in which Z is a polyvalent (at least trivalent) aromatic or arylaliphatic hydrocarbon radical and x is between 1 and 10.

Z can, for example, be a polyvalent radical of benzene, methylbenzene, naphthalene, biphenyl, diphenyl ether, diphenyl sulfide, diphenyl sulfone, ditolyl ether, xylylene, diethylbenzene, pyridine, and the like.

The term "arylaliphatic radical" is understood to mean a radical according to which at least one acid functional group of the compound of formula (I) is not attached to this radical via a carbon atom forming part of an aromatic ring.

Advantageously, Z comprises between 6 and 18 carbon atoms.

The compound A1) is preferably chosen from 2-hydroxyterephthalic acid, 5-hydroxyisophthalic acid, 4-hydroxyisophthalic acid and 2,5-dihydroxyterephthalic acid.

In the context of the invention, mixtures of different compounds A1) can be employed.

The modified polyamide of the invention can be obtained from in particular a diacid monomer B).

Advantageously, the compound B) is of following formula (V):

$$HOOC—R'—COOH \qquad (V)$$

in which R' is a divalent aliphatic, cycloaliphatic, arylaliphatic or aromatic hydrocarbon radical.

Preferably, the R' radical comprises between 2 and 18 carbon atoms.

The term "arylaliphatic diacid" is understood to mean a diacid, at least one of the acid functional groups of which is not attached to a carbon atom forming part of an aromatic ring.

According to a specific embodiment of the process of the invention, the compound B) is an aliphatic diacid. The aliphatic acid can, for example, be chosen from oxalic acid, maleic acid, succinic acid, pimelic acid or azelaic acid. It can also comprise unsaturations; this is the case, for example, with maleic acid or fumaric acid.

The dicarboxylic acids can also be chosen from glutaric acid, adipic acid, suberic acid, sebacic acid, dodecanedioic acid, 1,2- or 1,3-cyclohexanedicarboxylic acid, 1,2- or 1,3-cyclohexanediacetic acid, and 1,2- or 1,3-phenylenediacetic acid. The preferred dicarboxylic acid is adipic acid.

In the context of the invention, mixtures of different compounds B) can be employed, in particular mixtures of aliphatic diacids and of aromatic diacids.

Advantageously, the monomer B) is solely of the B1) type. However, it is also possible to add an aromatic diacid monomer B2), such as, for example, isophthalic acid, terephthalic acid, 4,4'-benzophenonedicarboxylic acid, 2,5-naphthalenedicarboxylic acid and p-(tert-butyl)isophthalic acid.

The molar proportion of monomer A1) with respect to the monomers A1), B1) and B2) is advantageously between 0.1 and 30%, advantageously between 0.5 and 25% and preferably between 5 and 20%.

The modified polyamide of the invention is also obtained from an aliphatic, cycloaliphatic or arylaliphatic diamine monomer C).

The diamines of use in the present invention advantageously have the formula $H_2N—R—NH_2$ (VI), in which R is a divalent hydrocarbon radical, in particular an aliphatic or arylaliphatic diradical or a substituted derivative of these diradicals. The R radical advantageously comprises between 2 and 18 carbon atoms.

The term "arylaliphatic diamine" is understood to mean a diamine, at least one of the amine functional groups of which is not attached to a carbon atom forming part of an aromatic ring.

Suitable aliphatic diamines comprise straight-chain aliphatic diamines, such as 1,10-diaminodecane, branched-chain aliphatic diamines, such as 2-methyl-1,6-diaminohexane, and cycloaliphatic diamines, such as di(aminomethyl) cyclohexanediamines.

The aliphatic chain can comprise heteroatoms, such as sulfur or oxygen, as represented by 3,3'-ethylene-dioxybis (propylamine), and it can also carry substituents, such as halogen atoms, which do not react under the polymerization conditions.

The diamines can, for example, be chosen from hexamethylenediamine, butanediamine, 2-methylpentamethylenediamine, 2-methylhexamethylenediamine, 3-methylhexamethylenediamine, 2,5-dimethylhexamethylenediamine, 2,2-dimethylpentamethylenediamine, nonanediamine, 5-methylnonanediamine, dodecamethylenediamine, 2,2,4- and 2,4,4-trimethylhexamethylenediamine, 2,2,7,7-tetramethyloctamethylenediamine, isophoronediamine, diaminodicyclohexylmethane and $C_2$-$C_{16}$ aliphatic diamines which can be substituted by one or more alkyl groups. The preferred diamine is hexamethylenediamine.

Mixtures of diamines can also be used in the present invention.

The modified polyamide of the invention can be obtained from in particular a lactam monomer or an amino acid D), preferably one which is aliphatic. Advantageously, the lactam or amino acid D) comprises between 2 and 18 carbon atoms. Mention may be made, as example of such lactams or amino acid's, of caprolactam, 6-aminohexanoic acid, 5-aminopentanoic acid, 7-aminoheptanoic acid, aminoundecanoic acid or dodecanolactam.

In the context of the invention, mixtures of different compounds D) can be employed.

The invention also relates to a process for the preparation of a modified polyamide described above by melt polymerization of the monomers of the polyamide.

The expression "melt polymerization" is understood to mean that the polymerization is carried out in the liquid state and that the polymerization medium does not comprise a solvent other than water, optionally. The polymerization medium can, for example, be an aqueous solution comprising the monomers or a liquid comprising the monomers.

Advantageously, the polymerization medium comprises water as solvent. This facilitates the stirring of the medium and thus its homogeneity.

The polymerization medium can also comprise additives, such as chain-limiting agents.

The modified polyamide of the invention is generally obtained by polycondensation at least between the monomers A1), B), C) and D), present in all or in part, to form polyamide chains with formation of the elimination product, in particular water, a portion of which may vaporize.

The modified polyamide of the invention is generally obtained by heating, at high temperature and high pressure, for example an aqueous solution comprising the monomers or a liquid comprising the monomers, in order to evaporate the elimination product, in particular water, present initially in the polymerization medium and/or formed during the polycondensation, while preventing any formation of solid phase in order to prevent the mixture from setting solid.

The polycondensation reaction is generally carried out at a pressure of approximately 0.5-2.5 MPa (0.5-3.5 MPa) at a temperature of approximately 100-320° C. (180-300° C.). The polycondensation is generally continued in the molten phase at atmospheric or reduced pressure, so as to achieve the desired degree of progression.

The polycondensation product is a molten polymer or prepolymer. It can comprise a vapor phase essentially composed of vapor of the elimination product, in particular of water, capable of having been formed and/or vaporized.

This product can be subjected to stages of separation of vapor phase and of finishing in order to achieve the desired degree of polycondensation. The separation of the vapor phase can, for example, be carried out in a device of cyclone type. Such devices are known.

The finishing consists in keeping the polycondensation product in a molten state, under a pressure in the vicinity of atmospheric pressure or under reduced pressure, for a time sufficient to achieve the desired degree of progression. Such an operation is known to a person skilled in the art. The temperature of the finishing stage is advantageously greater than or equal to 100° C. and in all cases greater than the temperature at which the polymer solidifies. The residence time in the finishing device is preferably greater than or equal to five minutes.

The polycondensation product can also be subjected to a solid-phase postcondensation stage. This stage is known to a person skilled in the art and makes it possible to increase the degree of polycondensation to a desired value.

The process of the invention is similar in its conditions to the conventional process for the preparation of polyamide of the type of those obtained from dicarboxylic acids and diamines, in particular to the process for the manufacture of polyamide 66 from adipic acid and hexamethylene diamine. This process for the manufacture of polyamide 66 is known to a person skilled in the art. The process for the manufacture of polyamide of the type of those obtained from dicarboxylic acids and diamines generally uses, as starting material, a salt obtained by mixing a diacid with a diamine in a stoichiometric amount, generally in a solvent, such as water. Thus, in the manufacture of poly(hexamethylene adipamide), the adipic acid is mixed with hexamethylenediamine, generally in water, in order to obtain hexamethylenediammonium adipate, better known under the name of Nylon salt or "N salt".

Thus, when the process of the invention employs a diacid B) and a diamine C), these compounds can be introduced, at least in part, in the form of a salt of compound B) and of compound C). In particular, when the compound B) is adipic acid and the compound C) is hexamethylenediamine, these compounds can be introduced at least in part in the N salt form. This makes it possible to have a stoichiometric equilibrium. Likewise, when the compound A1) is a diacid, the compound A1) and the diamine C) can be introduced in the salt form.

The process of the invention generally results in a random polymer.

The modified polyamide obtained at the end of the finishing stage can be cooled and formed in the granules.

The modified polyamide obtained by the process of the invention in the molten form can be directly formed or can be extruded and granulated for subsequent forming after melting.

The modified polyamide of the invention exhibits the advantage of being able to be easily converted by a molten route, such as aliphatic polyamides, for example, which facilitates the forming thereof. Furthermore, it exhibits improved thermomechanical properties; for example, they exhibit a higher glass transition temperature than aliphatic polyamides. Finally, they show better water uptake properties, in comparison with aliphatic polyamides.

The polyamide of the invention can be in the form of a composition which is based on the modified polyamide as matrix and which comprises additives, such as reinforcing fillers, flame retardants, UV stabilizers, heat stabilizers, mattifying agents, such as titanium dioxide, pigments, dyes, and the like.

The modified polyamide of the invention can be used as starting material in the field of engineered plastics, for example in the production of articles molded by injection molding or by injection/blow molding, of articles extruded by conventional extrusion or by extrusion/blow molding, or of films or powders.

The modified polyamide of the invention can also be put into the form of yarns, fibers or filaments by melt spinning.

Other details or advantages of the invention will become more clearly apparent in the light of the examples given below.

EXAMPLES

Characterizations

Contents of acid end groups (CEGs) and amine end groups (AEGs): titrated by potentiometry and expressed in meq/kg.

Number-average molar mass, determined by the formula $Mn=2\times10^6/(AEG+CEG)$ and expressed in g/mol.

Melting point (Tm) and associated enthalpy (ΔHf), crystallization temperature on cooling (Tc): determined by differential scanning calorimetry (DSC) using a Perkin Elmer Pyris 1 device at a rate of 10° C./min.

Glass transition temperature (Tg), determined on the same device at a rate of 40° C./min.

Comparative Example 1

Unmodified PA 66

92.6 kg (353 mol) of N salt (1:1 salt of hexamethylenediamine and of adipic acid), 84 kg of demineralized water and 6.4 g of antifoaming agent Silcolapse 5020® were introduced into a polymerization reactor. The polyamide 66 is manufactured according to a standard process for polymerization of polyamide 66 type, with 30 minutes of finishing. The polymer obtained is cast in the rod form, cooled and formed into granules by cutting up the rods.

The polymer obtained exhibits the following characteristics: at mid-casting, CEG=70.2 meq/kg, AEG=51.5 meq/kg, Mn=16 430 g/mol.

The polyamide 66 is semicrystalline and has the following thermal characteristics:

Tg=70.6° C., Tc=230.9° C., Tm=263.7° C., ΔHf=68.4 J/g.

Example 1

Preparation of a 95/5 Molar PA 66/6HIA Copolyamide 87.3 kg (332.8 mol) of N salt (1:1 salt of hexamethylenediamine and of adipic acid), 3219 g of 99.5% 5-hydroxyisophthalic acid (HIA) (17.6 mol), 6276 g of a 32.4% by weight solution of hexamethylenediamine (HMD) in water (17.4 mol), 81.2 kg of demineralized water and 6.4 g of antifoaming agent Silcolapse 5020® are introduced into a polymerization reactor. The copolyamide is manufactured according to a standard process for polymerization of polyamide 66 type, with 35 minutes of finishing. The polymer obtained is cast in the rod form, cooled and formed into granules by cutting up the rods.

The polymer obtained exhibits the following characteristics: at mid-casting: CEG=78.4 meq/kg, AEG=57.6 meq/kg, Mn=14 700 g/mol.

The copolyamide is semicrystalline and has the following thermal characteristics:

Tg=76.8° C., Tc=218.4° C., Tm=256.2° C., ΔHf=62.5 J/g. The copolyamide has a Tg greater by 6.2° C. with respect to that of the PA 66.

Example 2

Preparation of an 85/15 PA 66/6HIA Copolyamide 76.9 kg (293.1 mol) of N salt (1:1 salt of hexamethylenediamine and of adipic acid), 9462 g of 99.5% 5-hydroxyisophthalic acid (HIA) (51.7 mol), 18624 g of a 32.25% by weight solution of hexamethylenediamine (HMD) in water (51.7 mol), 72.6 kg of demineralized water and 6.4 g of antifoaming agent Silcolapse 5020® are introduced into a polymerization reactor. The copolyamide is manufactured according to a standard process for polymerization of polyamide 66 type, with 35 minutes of finishing. The polymer obtained is cast in the rod form, cooled and formed into granules by cutting up the rods.

The polymer obtained exhibits the following characteristics:

At mid-casting, CEG=82.7 meq/kg, AEG=61.5 meq/kg, Mn=13 870 g/mol.

The copolyamide is semicrystalline and has the following thermal characteristics:

Tg=85.8° C., Tc=186.2° C., Tm=240.4° C., ΔHf=41.9 J/g. The copolyamide has a Tg greater by 15.2° C. with respect to that of the PA 66.

Examples 3 and 4

Preparation of 80/20 and 70/30 PA 66/6HIA

The preparation is carried out, in examples 3 and 4, according to a standard process for polymerization of polyamide 66 type as in example 1 but with 30 minutes of finishing, of PA 66/6HIA of molar composition 80/20 (example 3) and of PA 66/6HIA of molar composition 70/30 (example 4).

The compositions (all the compositions comprise 2 g of antifoaming agent) and characterizations of these polymers are mentioned in the following table 1.

TABLE 1

| Example | PA 66/6HIA (molar) | N salt (g) | 99% HIA (g) | 32.54% HMD in water (g) | Water (g) | Mn (g/mol) | Tg (° C.) | Tc (° C.) | Tm (° C.) |
|---|---|---|---|---|---|---|---|---|---|
| 3 | 80/20 | 116.3 | 20.4 | 39.6 | 109.2 | 11 900 | 86.2 | 174.7 | 232.2 |
| 4 | 70/30 | 100.2 | 30.1 | 58.5 | 96.1 | 11 000 | 85.3 | 161.2 | 209.9 |

Example 5

Preparation of a 90/10 PA 6/6HIA Polyamide 102.87 g of caprolactam (0.9 mol), 18.50 g of 99.6% 5-hydroxyisophthalic acid (HIA) (0.1 mol), 36.40 g of a 32.25% by weight solution of hexamethylenediamine (HMD) in water (0.1 mol), 38.9 g of demineralized water and 2 g of antifoaming agent are introduced into a polymerization reactor. The copolyamide is manufactured according to a standard process for polymerization of polyamide 6 type. The polymer obtained is cast in the rod form, cooled and shaped into granules by cutting up the rods. The granules are washed in hot water, in order to extract the caprolactam, and dried before analyses.

The polymer obtained exhibits the following characteristics:

CEG=113 meq/kg, AEG=86.4 meq/kg, Mn=10 030 g/mol.

The polyamide 90/10 PA 6/6HIA is semicrystalline and has the following thermal characteristics:

Tg=72.3° C., Tm=178.6° C. The copolyamide has a Tg greater by 14.8° C. with respect to that of the PA 6 (Tg=57.5° C.)

Example 6

Preparation of a 58.5/31.5/10 PA 66/6T/6HIA Polyamide 84.06 g of N salt (0.32 mol), 48.73 g of a 6T salt (1:1 salt of hexamethylenediamine and of terephthalic acid) (0.17 mol), 10.06 g of 99.6% 5-hydroxyisophthalic acid (HIA) (0.055 mol), 19.74 g of a 32.25% by weight solution of hexamethylenediamine (HMD) in water (0.055 mol), 122.38 g of demineralized water and 2 g of antifoaming agent are introduced into a polymerization reactor. The copolyamide is manufactured according to a standard process for polymerization of polyamide 66 type at a final temperature of 290° C., without finishing.

The polymer obtained is cast in the rod form, cooled and formed into granules by cutting up the rods. The granules are washed in hot water, in order to extract the caprolactam, and dried before analyses.

The polymer obtained exhibits the following characteristics:

CEG=119.5 meq/kg, AEG=45.8 meq/kg, Mn=12 100 g/mol.

The 58.5/31.5/10 PA 66/6T/6HIA polyamide is semicrystalline and has the following thermal characteristics:

Tg=96.3° C., Tc=208.7° C., Tm=261.1° C., ΔHf=35.6 J/g. The copolyamide has a Tg greater by +26° C. with respect to that of the PA 66.

What is claimed is:

1. A modified polyamide comprising a polyamide modified by a compound comprising at least one aromatic hydroxyl group chemically bonded to the chain of the polymer, wherein the polyamide is produced by polymerization starting from at least the following monomers:
   i) A1) a difunctional hydroxyaromatic compound comprising two functional groups, wherein the two functional groups can react with an amine functional group, and wherein the compound A1) is a compound of following formula (I):

$$(HO)_x\text{---}Z\text{---}(COOH)_2 \quad (I)$$

in which Z is a polyvalent, at least trivalent, aromatic or arylaliphatic hydrocarbon radical and x is between 1 and 10; and
   ii) at least one polyamide monomer selected from the group consisting of:
      B) a dicarboxylic acid compound which is B1), an aliphatic or cycloaliphatic or arylaliphatic diacid, and
      C) an aliphatic, cycloaliphatic or arylaliphatic diamine, and
      D) a lactam or an amino acid, optionally one which is aliphatic;
   where when the monomer B is solely of the B1) type, the molar proportion of monomer A1) with respect to the monomers A1) and B) is between 0.1% and 30%.

2. The modified polyamide as claimed in claim 1, wherein that the functional groups of the compound A1) are acid functional groups.

3. The modified polyamide as claimed in claim 1, wherein that Z comprises between 6 and 18 carbon atoms.

4. The modified polyamide as claimed in claim 1, wherein the compound A1) is selected from the group consisting of 2-hydroxyterephthalic acid, 5-hydroxyisophthalic acid, 4-hydroxyisophthalic acid and 2,5-dihydroxyterephthalic acid.

5. The modified polyamide as claimed in claim 1, wherein the compound B) is of following formula (V):

HOOC—R'—COOH (V)

in which R' is a divalent aliphatic, cycloaliphatic, arylaliphatic or aromatic hydrocarbon radical.

6. The modified polyamide as claimed in claim 5, wherein the R' radical comprises between 2 and 18 carbon atoms.

7. The modified polyamide as claimed in claim 5, wherein the compound B) is an aliphatic diacid.

8. The modified polyamide as claimed in claim 1, wherein the compound C) is of following formula (VI):

$H_2N$—R—$NH_2$ (VI)

in which R is a divalent aliphatic, cycloaliphatic, arylaliphatic or aromatic hydrocarbon radical.

9. The modified polyamide as claimed in claim 8, wherein the R radical comprises between 2 and 18 carbon atoms.

10. The modified polyamide as claimed in claim 1, wherein the lactam or amino acid D) comprises between 2 and 18 carbon atoms.

11. A process for the preparation of a modified polyamide as claimed in claim 1, the process comprising melt polymerizing of the monomers A1) and/or B) and/or C) and/or D).

12. An article obtained from the modified polyamide as claimed in claim 1, wherein the article is produced by molding, injection molding, injection/blow molding, extrusion/blow molding, extrusion or spinning.

13. The polyamide as claimed in claim 1, wherein the molar proportion of monomer A1) with respect to monomers A1) and B) is between 0.5% and 25%.

14. The polyamide as claimed in claim 1, wherein the molar proportion of monomer A1) with respect to monomers A1) and B) is between 5% and 20%.

* * * * *